United States Patent

[11] 3,581,181

[72] Inventor Robert H. Wallace
 Littleton, Colo.
[21] Appl. No. 759,546
[22] Filed Sept. 13, 1968
[45] Patented May 25, 1971
[73] Assignee Honeywell Inc.
 Minneapolis, Minn.

[54] SERVOMOTOR DRIVING AND BRAKING CIRCUIT
 6 Claims, 1 Drawing Fig.
[52] U.S. Cl............................................ 318/640,
 318/640, 318/379
[51] Int. Cl...................................................... G05f 1/00
[50] Field of Search............................................318/20.605,
 375, 379

[56] References Cited
 UNITED STATES PATENTS
 3,204,171 8/1965 Aim............................... 318/379
 3,327,186 6/1967 Gregory, Jr. et al. ......... 318/28
 3,453,517 7/1969 Kennedy et al. .............. 318/257
 3,463,991 8/1969 Yuminaka et al.............. 318/379

*Primary Examiner*—Benjamin Dobeck
*Attorneys*—Arthur H. Swanson, Lockwood D. Burton and George E. Bodenstein

ABSTRACT: Two AC energized back-to-back silicon-controlled rectifiers power a motor which positions both the projection lens of a projector and a beam of light reflected from a slide in the projector. This beam falls on a pair of photosensitive resistors in an AC bridge circuit which is balanced when the beam is centered on the resistors, and which produces an output voltage for controlling the rectifiers through a transistor when the beam is displaced from center by the shifting of the slide from a focused position. The rectifiers then drive the motor to return the beam to the balance position and deenergize the motor. The concurrent movement of the projection lens refocus the slide. The contacts of a reed switch, having its coil connected in series with the motor, short circuit the latter to brake its motion whenever the motor is not energized.

PATENTED MAY 25 1971
3,581,181
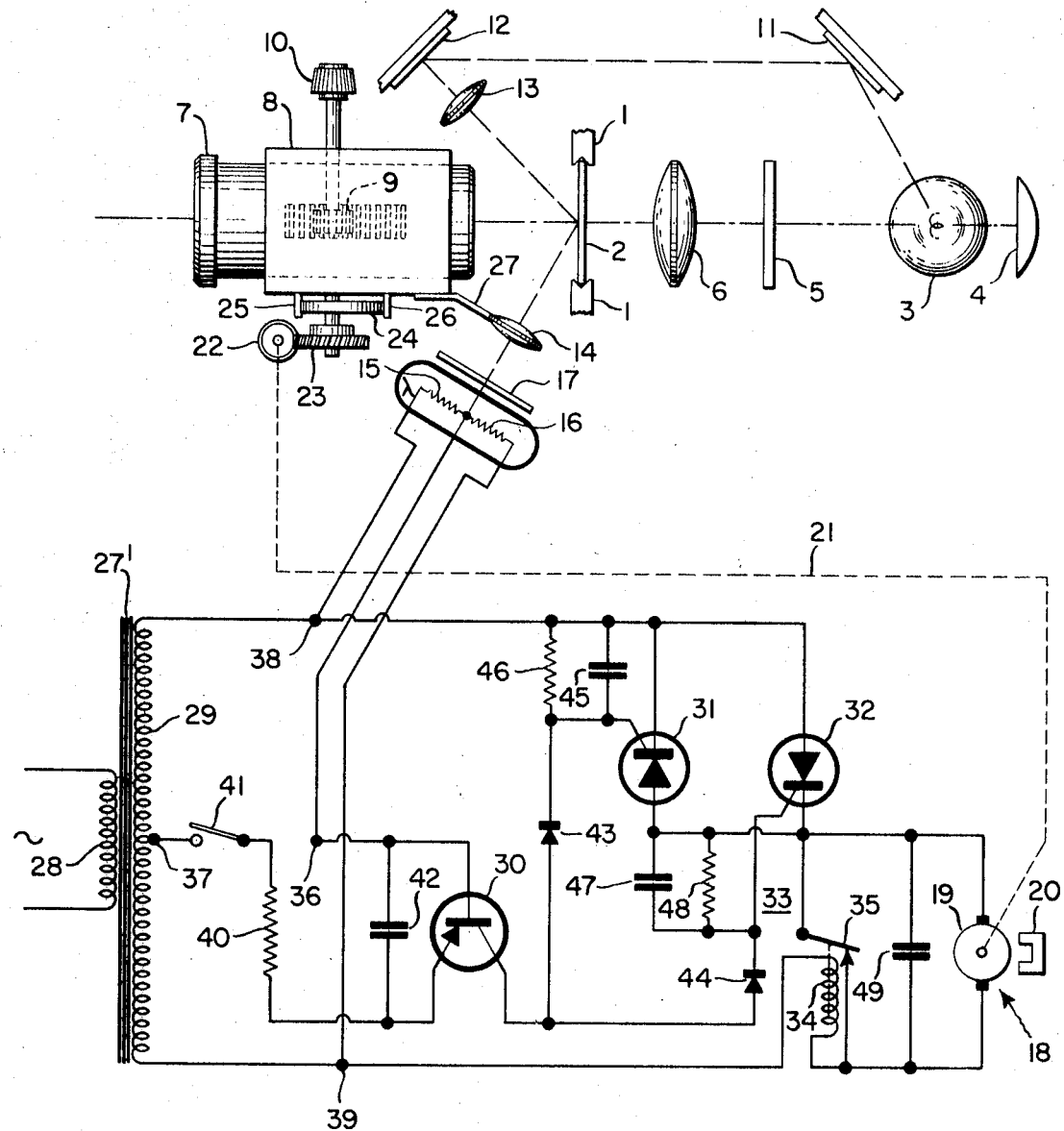
INVENTOR.
ROBERT H. WALLACE
BY
George E. Bodenstein
AGENT.

SERVOMOTOR DRIVING AND BRAKING CIRCUIT

Electronic controlling or driving circuits for electric motors, such as servomotors, have been known in the past in which the conductivity of vacuum tubes or semiconductor devices is controlled to control the energization of the motor. While such circuits and the servo arrangements employing them have been used in a great variety of applications, a particularly challenging one of these uses has been that wherein the servo apparatus operates to maintain a slide projector in focus. Examples of such arrangements, wherein an electronically controlled motor provides an automatic focusing action in a slide projector, are found in U.S. Pat. Nos. 3,249,001 and 3,359,667.

Although the previously known motor drive circuits and their servo embodiments, such as those disclosed in the above-noted two patents, have in general performed their intended functions in an acceptable manner, the known arrangements have usually been characterized by one or more undesirable properties, such as those of excessive size, excessive cost, undue complexity, insufficient accuracy, and insufficient operating speed for the particular requirements involved. There has thus existed a need for an improved motor drive circuit which is smaller, simpler, and cheaper than those previously known, but which, nevertheless, operates the controlled motor with the high speed, high accuracy, and high degree of reliability demanded in many applications, such as the automatic projector-focusing application referred to above.

Accordingly, it is an object of the present invention to provide an improved motor drive circuit which fulfills the foregoing need for a fast, reliable, and accurate, yet simple and inexpensive, device of this type. It is a specific object of the invention to provide such an improved circuit which is smaller in size and less expensive to produce than are the previously known arrangements of this general type, but which nevertheless operates with greater speed, accuracy, and reliability than have the previously known arrangements.

An additional object of the invention is to provide an improved motor drive circuit as specified above which is particularly well adapted for use in a slide projector automatic focusing servo arrangement. Another object of the invention is to provide improved automatic projector focusing apparatus embodying such an improved motor drive circuit.

In accomplishing these and other equally desirable objects, the improved motor drive circuit provided in accordance with the present invention utilizes a pair of back-to-back connected thyristors, such as silicon controlled rectifiers, in series with the armature of a reversible DC motor across a source of alternating current. A source of reversible phase control voltage, such as an AC energized photosensitive bridge circuit, controls a transistor which in turn controls the gate-cathode signals of the rectifiers so that the latter send currents through the motor which drive it in a direction dependent upon the direction of bridge unbalance. The operation of the motor moves a device to be servo positioned, such as a projector lens, and also moves a light beam on the bridge circuit in a direction to rebalance the bridge and deenergize the motor.

A reed switch, energized from the rectifiers, drops out to short circuit the motor whenever no current is being delivered by the rectifiers. This condition occurs when the bridge is balanced, and also occurs during a part of each cycle of the alternating current when the bridge is unbalanced. This construction permits the motor to be driven at high speed for moving the positioned device and for rebalancing the bridge, while minimizing the tendency of the apparatus to overshoot and hunt.

A better understanding of the present invention may be had from the following detailed description when read in connection with the accompanying drawing, in which the single FIGURE is a diagrammatic showing of an improved motor drive circuit according to the present invention as embodied in an automatic focusing arrangement of a slide projector.

Referring to the drawing, the projector embodying the improved motor drive circuit according to the present invention includes a slide holder 1 which is arranged to hold a photographic transparency, such as a slide 2, which is to be projected. The slide 2 is illuminated for projection by a projection lamp 3 which has cooperating therewith the usual reflector 4, infrared or heat filter 5, condensing lens 6, and projection lens 7. The latter is supported in a holder 8, wherein it is axially adjustable through the medium of a rack and pinion drive 9 driven by a manual focusing knob 10.

To provide the automatic focusing action in the projector, a portion of the radiation or light emitted by the lamp 3 is caused to fall directly on a mirror 11, without passing through the filter 5. This light, which includes infrared components, is reflected from the mirror 11 onto a second mirror 12. The light is then reflected from the mirror 12 and passes as a small light beam through a lens 13, which focuses the beam onto the front surface of the slide 2.

The light beam is reflected from the slide surface and is focused by a lens 14 onto photosensitive elements 15 and 16. The latter, which may well be cadmium sulfide photosensitive resistors, are located in closely spaced relationship, and are provided with an infrared pass filter 17. This filter insures that the elements 15 and 16 will not be affected by light other than infrared. In this way, the elements 15 and 16 are effectively kept responsive to the light beam, with its infrared components, which is reflected from the slide 2, but are prevented from responding to light other than infrared, such as the projection light passing through the slide 2.

The elements 15 and 16 control the operation of a focusing motor 18 through the aforementioned novel motor drive circuit, which will be described in detail hereinafter. The motor 18 is shown as being of the DC permanent field type, having an armature 19 and a permanent magnet field 20.

The purpose of the motor 18 is to move the holder 8, carrying the lens 7, axially with respect to the slide 2 and the remainder of the projector. To this end, the armature 19 is mechanically coupled by a suitable mechanical linkage 21 to a worm gear 22 which meshes with a worm wheel 23. The latter drives an eccentric cam 24 which is trapped between projections 25 and 26 on the holder 8. Accordingly, rotation of the armature 19 in one direction moves the holder 8 and the lens 7 toward the slide 2, and armature rotation in the opposite direction moves the holder 8 and the lens 7 away from the slide 2.

The lens 14 is carried by a bracket 27 which is attached to the holder 8 and which moves therewith. The purpose of this construction is to provide a followup or balancing action in the automatic focusing arrangement, as will be seen from the description which follows.

The optical aspects of the present apparatus as thus far described do not differ essentially from those of the apparatus shown in the aforementioned U.S. Pat. No. 3,249,001. In describing the general operation of the present automatic focusing arrangement, therefore, it is sufficient to note that the motor 18 operates to maintain the axial distance or spacing between the lens 7 and the front surface of the slide 2 constant at an initially set value. This set value is that at which the projected image of the slide is in proper focus on a projection screen of the like, not shown. This value is established by manually rotating the knob 10, to move the lens 7 within the holder 8, until the projected image is properly focused.

At the time of this initial manual focusing, the aforementioned light beam, which is reflected from the slide surface, falls at a central or balanced position on the elements 15 and 16 and illuminates these elements substantially equally. Under this condition, the motor 18 is not urged for rotation, but remains stationary.

Any subsequent movement of the slide, or of subsequently projected slides, which changes the actual value of said lens-slide distance from said set value causes the projected image to become out of focus. Such movement also causes the reflected light beam to move on the elements 15 and 16 from the balanced position, and to illuminate one of the elements more than the other. This causes the motor 18 to rotate in the proper direction to so move the holder 8 and the lens 14 that the light beam is moved across the elements 15 and 16 until it is again centrally located with respect thereto, and again illuminates the elements 15 and 16 substantially equally. When this balanced condition is reestablished, the motor is instantly stopped, and the lens 7 will have been repositioned so that said lens-slide distance again has said set value, and the projected image is again in focus.

The novel circuit which controls the motor 18 to cause it to operate in the foregoing manner includes, in addition to the elements 15 and 16, a transformer 27', having a primary winding 28 and a center-tapped secondary winding 29, a transistor 30, silicon-controlled rectifiers (SCR's) 31 and 32, a reed switch 33 having an operating coil 34 and a pair of normally closed contacts 35, and various other components to be described hereinafter. The winding 28 is connected to, and energized from, a suitable source of alternating current, not shown.

The photosensitive elements 15 and 16 together with the winding 29 form a bridge circuit which is energized by the alternating current induced in the winding 29, and which has bridge output terminals 36 and 37. In this bridge circuit, the upper end terminal of the winding 29 is connected to an energizing junction 38, while the lower end terminal of the winding 29 is connected to an energizing junction 39. The elements 15 and 16 are connected in series between the junctions 38 and 39, and their common junction is connected to the bridge output terminal 36. The center tap of the winding 29 forms the bridge output terminal 37.

The terminal 36 is connected to the base of the transistor 30, while the emitter of the latter is connected through a resistor 40 and an on-off switch 41 to the terminal 37. Thus, the output of the bridge circuit is connected between the base and emitter of the transistor 30 when the switch 41 is closed. A capacitor 42 is connected between the base and emitter of the transistor 30 to make the latter insensitive to other than the bridge circuit output voltage.

The collector of the transistor 30 is connected through a diode 43 to the gate of the SCR 31, and through a diode 44 to the gate of the SCR 32. The diodes 43 and 44 serve to isolate the SCR gates. The cathode of the SCR 31 is connected to the gate thereof by a capacitor 45 and a resistor 46 connected in parallel, while the cathode of the SCR 32 is connected to the gate thereof by the parallel combination of a capacitor 47 and a resistor 48. The resistors 46 and 48 serve to suitably reduce the sensitivity of the SCR's, while the capacitors 45 and 47 serve to prevent the SCR's from being triggered by extraneous effects.

The cathode of the SCR 31 and the anode of the SCR 32 are connected to the energizing junction 38, while the anode of the SCR 31 and the cathode of the SCR 32 are connected through the motor armature 19 and the reed switch coil 34 to the energizing junction 39. Thus, the SCR's 31 and 32 are connected in a back-to-back configuration in series with the armature 19 and the coil 34 across the secondary winding 29.

The reed switch contacts 35 are connected directly across the armature 19. In this way, whenever either of the SCR's 31 and 32 is turned on and is passing current, and the coil 34 is thus energized and the contacts are thus open, the switch 33 has no effect on the operation of the motor 18. When neither of the SCR's 31 and 32 is conducting and the coil 34 is thus deenergized, as occurs when both of the SCR's are turned off or when the alternating supply voltage is passing through zero, the contacts 35 short circuit the armature 19 and subject the motor 18 to a braking action. A capacitor 49 is connected across the contacts 35 to protect them from transient voltages which may develop in the armature 19.

By virtue of the foregoing connections, the bridge circuit produces an AC output voltage of variable magnitude and of reversible phase between the terminals 36 and 37 which controls the conductivity of the transistor 30 which, in turn, controls the gating and conductivity of the SCR's 31 and 32 and the operation of the motor 18. To illustrate this, let it be assumed that the light beam is in its balance position on the elements 15 and 16. Under this condition, there is no bridge output voltage between the terminals 36 and 37, and the transistor 30 is maintained in a turned off or nonconductive condition. There is thus no gate current flow to the SCR's 31 and 32, whereby the latter are maintained in the turned off or nonconductive condition. Since no current is passing through the SCR's, the coil 34 is deenergized, the contacts 35 short circuit the armature 19, and the latter is prevented from rotating.

Let it now be assumed that the light beam is moved to an off-balance position in which it illuminates the element 15 more than it illuminates the element 16. This causes the production between the terminals 36 and 37 of an AC bridge output or unbalance voltage which can be said to be of the same phase as the supply voltage between the junctions 38 and 39, and which has a magnitude dependent upon the extent of the inequality of illumination of the elements 15 and 16. During the half-cycles (first half-cycles) of the supply voltage between the junctions 38 and 39 in which the junction 38 is made positive with respect to the junction 39, the above-noted output voltage reverse biases the transistor 30, so that the latter remains turned off, as do the SCR's 31 and 32.

During the alternate supply voltage half-cycles, in which the junction 39 is positive with respect to the junction 38, the above-noted output voltage turns on the transistor 30. This makes the gate of the SCR 31 positive with respect to the cathode thereof, which turns on the SCR 31. The latter then passes energizing current through the coil 34 and the contacts 35. As a result, the contacts 35 open substantially instantly, whereby the energizing current from the SCR 31 now passes through the armature 19, in an upward direction as viewed in the drawing. Such energization of the armature 19 causes it to rotate in a corresponding direction, which is the direction in which the armature 19 moves the lens 14 in the direction to return the light beam to its balance position on the elements 15 and 16.

Accordingly, the above-noted output voltage causes the SCR 31 to become conductive and to pass current to energize the coil 34, and to energize the armature 19 in a rebalancing direction, during each of said alternate half-cycles. During these half-cycles, the SCR 32 is not turned on, since its cathode is positive with respect to its gate and its anode.

Since neither of the SCR's 31 and 32 is turned on throughout said first half-cycles, the coil 34 is deenergized, the contacts 35 are closed, and the armature 19 is subjected to a braking action throughout these half-cycles. Therefore, as long as the above noted output voltage is present, the armature 19 is alternately energized and braked in synchronism with the alternations of the AC supply voltage. By so braking the armature 19 every other half-cycle, the rotational speed of the armature 19 is desirably made substantially independent of the magnitude of the bridge output voltage, whereby very small output voltages desirably produce nearly the same armature and rebalancing speed as do large output voltages.

As a result, the foregoing rebalancing action is accomplished at maximum speed until the instant at which balance is produced and the output voltage disappears. At this time, neither SCR is made conductive in either half-cycle, so that the contacts 35 remain closed. This causes the armature 19 to come to a substantially instantaneous stop at the instant that the light beam is brought back to the balance position on the elements 15 and 16 and reduces the bridge output voltage to zero, notwithstanding the fact that the armature 19 was desirably driving the lenses 14 and 7 at substantially full speed as the balance condition was approached.

An unbalance condition in the opposite direction, which causes the element 16 to receive more illumination than does the element 15, causes the production between the terminals 36 and 37 of an AC bridge output voltage which is of the opposite phase with respect to both the supply voltage and the first-noted output voltage. Under this condition, the SCR 31 is maintained turned off, but the SCR 32 is turned on, to energize the armature 19 for rotation in the opposite direction, during each of said first half-cycles. Aside from being in the opposite direction, the rebalancing action which takes place is the same as that described above for bridge unbalance in the opposite direction.

In conclusion, it is seen that the foregoing novel construction according to the present invention, including the cooperating thyristors, reed switch, and motor, constitutes a relatively simple and reliable arrangement which, nevertheless, provides a maximum motor drive or rebalancing speed with substantially no over-shoot or hunting, and hence provides an extremely rapid and accurate servo positioning action.

The embodiments of the invention in which I claim an exclusive property or privilege are defined as follows:

1. Apparatus for controlling the rotation of a motor, comprising
    a motor having an armature provided with first and second terminals and rotating in a direction dependent upon the direction of current flow therethrough,
    first and second thyristors, each having an anode, a cathode, and a gate electrode,
    first and second supply terminals arranged for connection to a source of alternating voltage,
    means connecting said first supply terminal to the anode of said first thyristor and to the cathode of said second thyristor,
    means connecting the cathode of said first thyristor and the anode of said second thyristor to said first terminal of said armature,
    means connecting said second terminal of said armature to said second supply terminal,
    a source of alternating control voltage of variable magnitude and of reversible phase with respect to that of the first mentioned alternating voltage,
    means connecting the last mentioned voltage source between the gates and cathodes of said thyristors to cause the latter to pass a current through said armature in one direction when said control voltage has one phase, and in the opposite direction when said control voltage has the opposite phase, and to pass substantially no current when the magnitude of said control voltage is substantially zero,
    a relay having an operating coil and contacts which open when said coil is energized, and which close when said coil is deenergized,
    means connecting said coil in circuit with said armature to cause said coil to be energized only when said thyristors pass current, and
    means connecting said contacts across said terminals of said armature.

2. Apparatus as specified in claim 1, wherein said armature is physically coupled to said source of control voltage to cause said rotation of said armature to adjust the magnitude of said control voltage in the direction to reduce the magnitude of the current flow through said armature towards zero.

3. Apparatus as specified in claim 2, wherein said source of control voltage is a bridge circuit which is energized from said supply terminals and which has a pair of output terminals, and wherein said control voltage is produced between said output terminals.

4. Apparatus as specified in claim 3, wherein said bridge circuit includes first and second photosensitive devices in adjacent bridge arms which cause the production of said control voltage between said output terminals when said devices are unequally illuminated, and wherein said rotation of said armature moves a light beam with respect to said devices in the direction to equalize the illumination thereof.

5. Apparatus as specified in any of claims 1, 2, 3, and 4, wherein said relay coil is connected in series with the parallel combination of said armature and said contacts.

6. Apparatus as specified in any one of claims 1, 2, 3, and 4, wherein said means connecting said source of control voltage to said thyristors includes a transistor having its base-emitter junction connected across said source of control voltage and having its collector connected to said gates of said thyristors.